United States Patent [19]

Brown et al.

[11] 4,123,965
[45] Nov. 7, 1978

[54] RACK AND PINION POWER STEERING GEAR

[75] Inventors: Arthur K. Brown; Donald J. Baker; Robert W. Jackson, all of South Bend, Ind.

[73] Assignee: The Bendix Corporation, Southfield, Mich.

[21] Appl. No.: 822,572

[22] Filed: Aug. 8, 1977

Related U.S. Application Data

[63] Continuation of Ser. No. 642,280, Dec. 19, 1975, abandoned.

[51] Int. Cl.² ............................ F01B 9/00; F16J 13/02
[52] U.S. Cl. ...................................... 92/136; 91/467; 92/164; 92/165; 180/148
[58] Field of Search .................... 91/467; 92/163, 164, 92/165, 166, 136; 180/148

[56] References Cited

U.S. PATENT DOCUMENTS

| | | | |
|---|---|---|---|
| 2,574,299 | 11/1951 | Sterrett | 92/166 |
| 2,858,802 | 11/1958 | Parsons et al. | 92/163 X |
| 2,867,284 | 1/1959 | Hrvska | 180/148 |
| 2,955,667 | 10/1960 | Cota | 180/148 |
| 3,103,986 | 9/1963 | Barton et al. | 180/148 |
| 3,195,422 | 7/1965 | Corwin | 92/164 |

FOREIGN PATENT DOCUMENTS 979,377  1/1965  United Kingdom ................. 180/148

Primary Examiner—Irwin C. Cohen
Attorney, Agent, or Firm—Paul David Schoenle; Ken C. Decker

[57] ABSTRACT

A rack and pinion power steering gear is disclosed which includes a manifolding arrangement to eliminate external fluid connections between the power steering valve and the cylinder. The manifolding arrangement includes a tube which is received within the steering housing. The diameter of the tube is less than the diameter of the housing in which the rack is received so that an annular fluid passage is defined between the outer circumferential surface of the tube and the inner circumferential surface of the housing. The annular passage communicates fluid the entire length of the rack mechanism, so that fluid may be selectively admitted to opposite sides of the piston depending upon the direction which the vehicle wheels are turned. The manifolding mechanism further includes a sleeve which extends into the tube and which is provided with passages extending therethrough to communicate fluid pressure to the other side of the piston. The sleeve also serves to seal against the rack to prevent fluid from leaking from the hydraulic cylinder. The entire manifolding arrangement is designed so that the same basic housing may be used for either power or manual rack and pinion gears, the manifolding arrangement being added to provide a power assist without any substantial change in the machining or design of the housing.

1 Claim, 1 Drawing Figure

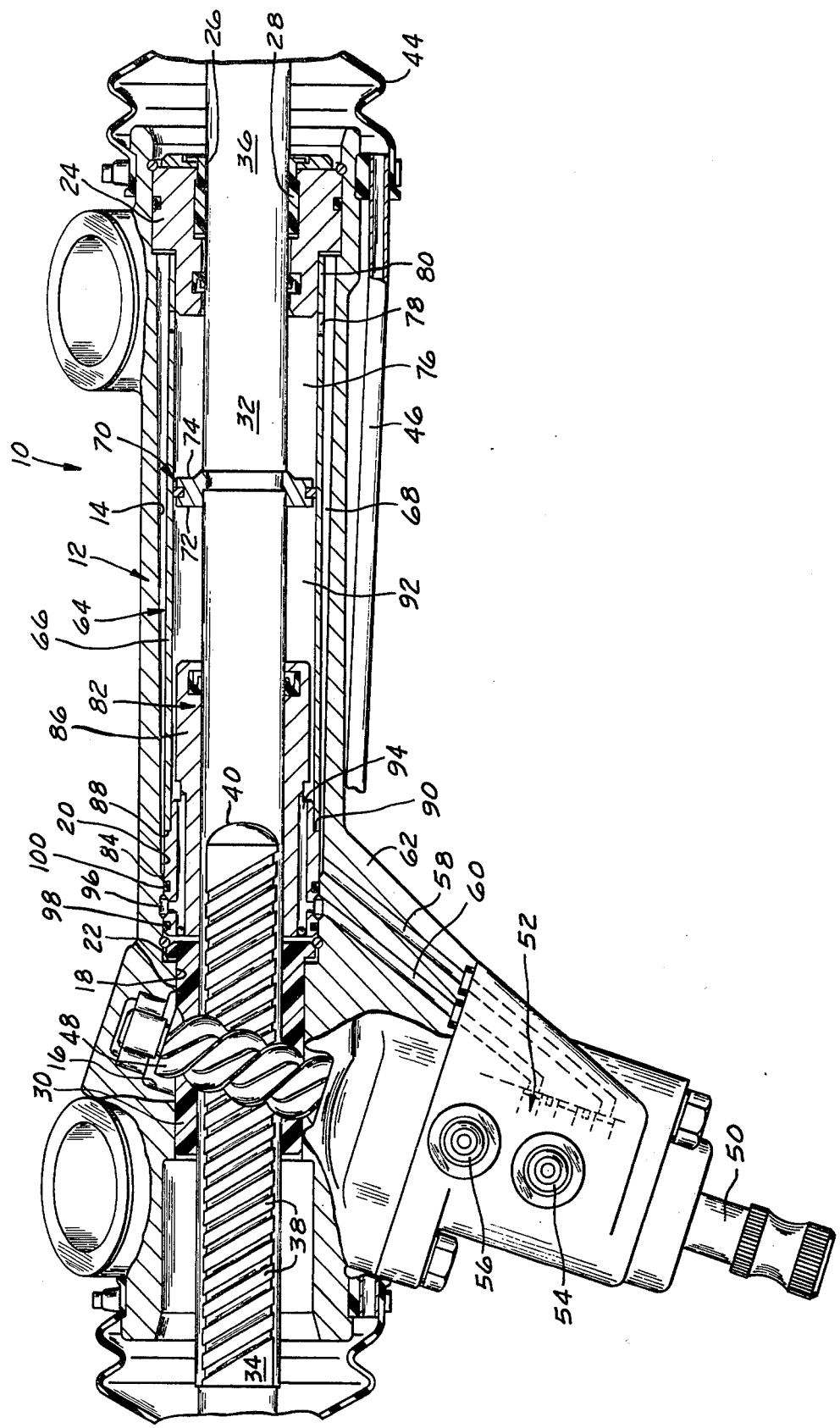

RACK AND PINION POWER STEERING GEAR

This is a continuation of application Ser. No. 642,280, filed Dec. 19, 1975, now abandoned.

BACKGROUND OF THE INVENTION

This invention relates to a rack and pinion power steering gear for automotive vehicles.

Rack and pinion steering gears have been used on automotive vehicles, and have significant advantages over other types of power steering units. However, most existing rack and pinion power steering units require at least two external fluid conduits between the power steering valve and the power cylinder. These external communications may be troublesome inasmuch as they introduce leak points into the system, and also make manufacture of these units more difficult. Furthermore, most existing rack and pinion power steering units have been designed in a completely different manner from their equivalent manual rack and pinion power steering systems. Therefore, completely different types of steering gear assemblies may have to be used on the same vehicle model depending on whether or not the vehicle is equipped with power steering.

SUMMARY OF THE INVENTION

Therefore, an important object of our invention is to simplify the design of a rack and pinion power steering unit by eliminating external communications between the rotary power steering valve and the power cylinder.

Another important object of our invention is to eliminate leak points inherent in prior art rack and pinion power steering units wherein fluid is communicated exteriorly of the housing between the steering valve and the power cylinder.

Still another important object of our invention is to design a rack and pinion power steering unit which, by the elimination of a few parts necessary only for a powered unit, may also be manufactured as a manual unit.

DESCRIPTION OF THE DRAWINGS

The sole FIGURE of the drawing is a fragmentary cross-sectional view of a rack and pinion power steering gear made pursuant to the teachings of our present invention.

DETAILED DESCRIPTION

Referring now to the drawing, a rack and pinion power steering gear generally indicated by the numeral 10 includes a housing generally indicated by the numeral 12. The housing defines a longitudinal bore 14 and a cross bore 16 therewithin. The longitudinal bore 12 is stepped to define a smaller diameter section 18 and a larger diameter section 20 with a shoulder 22 therebetween. A plug 24 is received in the right hand end of the bore 14 (viewing the FIGURE) and is provided with an aperture 26 therewithin which receives a bearing 28. Another bearing member 30 is received in the smaller diameter portion 18 of the bore 14. The bearings 28, 30 cooperate with one another to slidably support a rack 32 for longitudinal movement within the housing 12. Opposite ends 34, 36 of the rack 32 project from corresponding ends of the housing 12 and are operatively connected to the left and right-hand wheels of the vehicle, respectively. As is conventional in the rack and pinion power steering art, the left hand end of the rack 32 is provided with rack teeth 38. However, the portion of the rack to the right of the line 40 is substantially circular and relatively smooth. Boots 42, 44 protect opposite ends of the rack 32 and the content of the boots 42, 44 are communicated to one another through the tube 46 in a conventional manner well known to those skilled in the art.

A pinion 48 is rotatably mounted in the cross bore 16 at its juncture with the longitudinal bore 14 and meshes with the teeth 38 of the rack 32 to urge the latter to the left or to the right as the vehicle is steered. The pinion 48 is mounted on a pinion shaft 50 which is connected to the steering wheel of the vehicle. A valving mechanism generally indicated by the numeral 52 is also responsive to rotation of the pinion shaft 50 to control fluid communication between an inlet port 54, an outlet port 56, and fluid passages or conduits 58, 60 which are provided in the boss 62 which interconnects the portion of the housing 12 defining the cross bore 16 and the portion of the housing dividing the longitudinal bore 14. One end of the conduits 60, 62 communicates with the valve mechanism 52, and the other end of the conduits communicate with the bore 14 in a manner to be described in detail hereinafter. The valve 52 may be manufactured according to any design well known to those skilled in the art, such as the design shown in U.S. Pat. No. 3,145,626, owned by the assignee of the present invention and incorporated herein by reference. The valve 52 is conventional and will not be disclosed in further detail herein.

To provide the power assist to the vehicle operator, the gear 10 is provided with a hydraulic motor and manifolding mechanism generally indicated by the numeral 64. The fluid motor manifolding mechanism 64 includes a tube 66, the outer diameter of which is slightly smaller than the inner diameter of the larger portion 20 of the bore 14. The outer circumferential surface of the tube 66 cooperates with the wall of the bore 14 to define an annular passage 68 therebetween. A double acting piston 70 having a pair of opposed faces 72 and 74, is rigidly mounted on the rack 32 is slidably and sealingly engaged with the inner circumferential surface of the tube 66. The face 74 of the piston 70 cooperates with the plug 24 to define the fluid pressure chamber 76 therebetween. An aperture 78 is provided near the end 80 of the tube which engages the plug 24 to communicate the annular passage 68 with the fluid chamber 76.

Manifolding and fluid motor mechanism 64 further includes a stepped sleeve generally indicated by the numeral 82. Sleeve 82 is stepped to define larger and smaller diameter portions 84, 86, respectively, which define a shoulder 88 therebetween. The opposite end 90 of the tube 66 engages the shoulder 88, so that the smaller diameter portion 86 of the sleeve 82 is received within the tube 66. The face 72 of the piston 70 cooperates with the tube 66 and the sleeve 82 to define another fluid chamber 92 therebetween. A passage 94 extends through the wall of the sleeve 82 to communicate the chamber 92 with an annular groove 96 which circumscribes the inner circumferential surface of the bore 14. A pair of appropriate fluid pressure seals 98, 100 prevent communication from the groove 96 except through the passage 94. The groove 96 is communicated to the valve mechanism 52 by the conduit 60, and the conduit 62 communicates the valve mechanism 52 with the annular passage 68.

MODE OF OPERATION

When the vehicle is travelling in a substantially straightahead direction, the various components of the steering gear 10 are disposed in the positions illustrated in the drawing. In this condition, the valve mechanism 52 communicates the conduits 58 and 60 to the outlet port 56 and therefore, to the inlet or low pressure side of the vehicle power steering pump. When the vehicle operator effects a right turn, the shaft 50 is rotated in a clockwise direction, thereby also rotating the pinion 48 in a clockwise direction. Because of the meshing engagement between the pinion 48 and the rack teeth 38, rotation of the pinion 48 in a clockwise direction urges the rack 32 to the left viewing the FIGURE. Since the ends 34, 36 of the rack 32 are connected to the left of the right front wheels of the vehicle, movement of the rack 32 to the left pivots the wheels in a direction effecting a right-hand turn. As the shaft 50 is rotated in the clockwise direction, valve 52 is effective to communicate a modulated pressure from the inlet port 54 to the fluid pressure conduit 68. The valve 52 continues to communicate the conduit 60 to the outlet port 56. Since the conduit 58 is communicated to the fluid pressure chamber 76 through the annular passage 68 in the aperture 78, a relatively high fluid pressure level will be communicated into the pressure chamber 76. However, since the conduit 60 continues to be communicated to the relatively low pressure level at the outlet port 56, the pressure level in the chamber 92 will be at substantially reservoir pressure, since it is communicated to the conduit 60 through the passage 94 and the groove 96. Therefore, the relatively high fluid pressure level in the chamber 76 reacting against the face 74 of piston 70 urges the latter, and thereby the rack 32, to the left, viewing the FIGURE, providing a power assist to the vehicle operator in moving the rack. Should the shaft 50 be rotated in the counterclockwise direction by the vehicle operator to effect a left-hand turn, the meshing engagement between the pinion 48 and the rack teeth 38 urges the rack to the right, viewing the FIGURE. The valve 52, in this case, is effective to vent the fluid conduit 58, and therefore the chamber 76, to the relatively low fluid pressure level at the outlet port 56, and to simultaneously communicate the relatively high fluid pressure in the inlet port 54 through the conduit 60 to the annular groove 96 and the passage 94 into the pressure chamber 92. Pressure in the pressure chamber 92 acts upon the face 72 of the piston 70 to urge the latter, and therefore the rack 32, to the right viewing the FIGURE, thereby providing a power assist to the vehicle operator to effect a right-hand turn.

The inherent advantage of the construction illustrated in the drawing is that, with the elimination of the manifolding and fluid motor mechanism 64 and the valve mechanism 52, the mechanism 10 can be used as a manual rack and pinion power steering gear, thereby saving considerable expense in manufacturing, since virtually all the same parts used in the manual steeing gear are also used in the power gear. The only additional parts that must be supplied to provide the power gear are the piston 70, the tube 66, the sleeve 82, and the valve 52.

We claim:

1. In a rack and pinion power steering gear assembly, a housing defining a longitudinal bore and a crossbore, said longitudinal bore having larger and smaller diameter portions, means closing one end of said longitudinal bore, a rack slidably mounted within said longitudinal bore, a pinion rotatably mounted on said cross bore and meshing with said rack, said rack being slidably supported by a bearing member within said longitudinal bore smaller diameter portion and by said closing means, a tube disposed within the larger portion of said longitudinal bore and circumscribing said rack, the outer circumferential surface of said tube cooperating with the inner circumferential surface of said longitudinal bore to define an annular passage therebetween, a piston mounted on said rack and cooperating with the inner circumferential surface of said tube to substantially define a pair of chambers, an opening in said tube to communicate said annular passage with one of said chambers, a pair of conduits within said housing communicating, respectively, with said annular passage and with the other of said chambers, a sleeve engaging said larger diameter portion of said longitudinal bore immediately adjacent said bearing member, said larger diameter portion of said longitudinal bore having an annular groove surrounding said sleeve, seal means interposed between the larger diameter portion of said longitudinal bore and said sleeve on both sides of said annular groove, one of said pair of conduits including a first section extending through the wall of said larger diameter portion of said longitudinal bore to communicate with the annular groove and a second section adjoining the annular groove, said second section being disposed entirely within said sleeve and extending therethrough to communicate directly with the annular groove and the other of said chambers.

* * * * *